(12) United States Patent
Ishii et al.

(10) Patent No.: US 8,774,080 B2
(45) Date of Patent: Jul. 8, 2014

(54) GATEWAY DEVICES AND WIRELESS CONTROL NETWORK MANAGEMENT SYSTEM USING THE SAME

(75) Inventors: Yousuke Ishii, Musashino (JP); Shuuji Yamamoto, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 355 days.

(21) Appl. No.: 12/634,812

(22) Filed: Dec. 10, 2009

(65) Prior Publication Data

US 2010/0150072 A1    Jun. 17, 2010

(30) Foreign Application Priority Data

Dec. 12, 2008  (JP) .................... 2008-316683

(51) Int. Cl.
- *G01R 31/08* (2006.01)
- *H04B 7/14* (2006.01)
- *H04W 4/00* (2009.01)
- *H04L 12/28* (2006.01)

(52) U.S. Cl.
USPC ....... 370/315; 370/238; 370/328; 370/395.31

(58) Field of Classification Search
None
See application file for complete search history.

(56) References Cited

U.S. PATENT DOCUMENTS

| | | | |
|---|---|---|---|
| 7,502,458 B2 * | 3/2009 | Zino et al. | 379/220.01 |
| 2003/0151513 A1 | 8/2003 | Herrmann et al. | |
| 2006/0083198 A1 * | 4/2006 | Eidenschink et al. | 370/329 |
| 2006/0083238 A1 | 4/2006 | Lee et al. | |
| 2009/0034419 A1 * | 2/2009 | Flammer et al. | 370/238 |
| 2010/0008272 A1 * | 1/2010 | Messinger et al. | 370/311 |
| 2010/0146067 A1 * | 6/2010 | Tapuska et al. | 709/207 |

FOREIGN PATENT DOCUMENTS

| | | |
|---|---|---|
| JP | 2005-033557 A | 2/2005 |
| JP | 2005-515695 A | 5/2005 |
| JP | 2006-166232 A | 6/2006 |
| WO | 01/61934 A1 | 8/2001 |
| WO | WO 0161934 A1 * | 8/2001 |
| WO | 03/061175 A2 | 7/2003 |
| WO | 2006/099023 A2 | 9/2006 |

OTHER PUBLICATIONS

European Search Report dated Feb. 12, 2010, issued in corresponding European Patent Application No. 09015059.0.
English abstract of CN1787474, corresponds to JP2006166232.

* cited by examiner

*Primary Examiner* — Jutai Kao
(74) *Attorney, Agent, or Firm* — Westerman, Hattori, Daniels & Adrian, LLP (57) ABSTRACT

An object of the invention is to improve the reliability of a wireless control network management system. Gateway devices for relaying data communication between a monitoring/controlling host connected thereto via a wired network and a plurality of wireless nodes connected thereto via wireless circuit and constituting a wireless network, wherein the gateway device comprises wireless communication means for sending data from the host to at least any one of the wireless nodes, and redirect means for causing the wireless communication means to send the data to one of the wireless nodes and to transfer the data to the other gateway device connected to the wired network.

3 Claims, 8 Drawing Sheets

GATEWAY DEVICES AND WIRELESS CONTROL NETWORK MANAGEMENT SYSTEM USING THE SAME

FIELD OF THE INVENTION

The invention relates to gateway devices and a wireless control network management system using the same, particularly to the improvement of reliability of the system.

BACKGROUND OF THE INVENTION

There has been recently proposed, for example, a process control system in an industrial automation, which is configured by a wireless control network system using wireless communication. This wireless control network system is provided to solve drawbacks, caused by a conventional control system configured by a wired network, in that sensors for measuring temperatures and flow rates can not be installed at an optimum position in a plant due to the limitation of a communication distance and restriction of routing of wirings, and so forth, thereby deteriorating control accuracy.

Further, there has been also proposed a wireless control network management system for controlling the operation of the wireless control network system to optimize the operation of the plant in whole.

There is the following prior art reference relating to a conventional wireless control network management system.

[Patent Document 1] JP 2005-515695A

Figure 7:
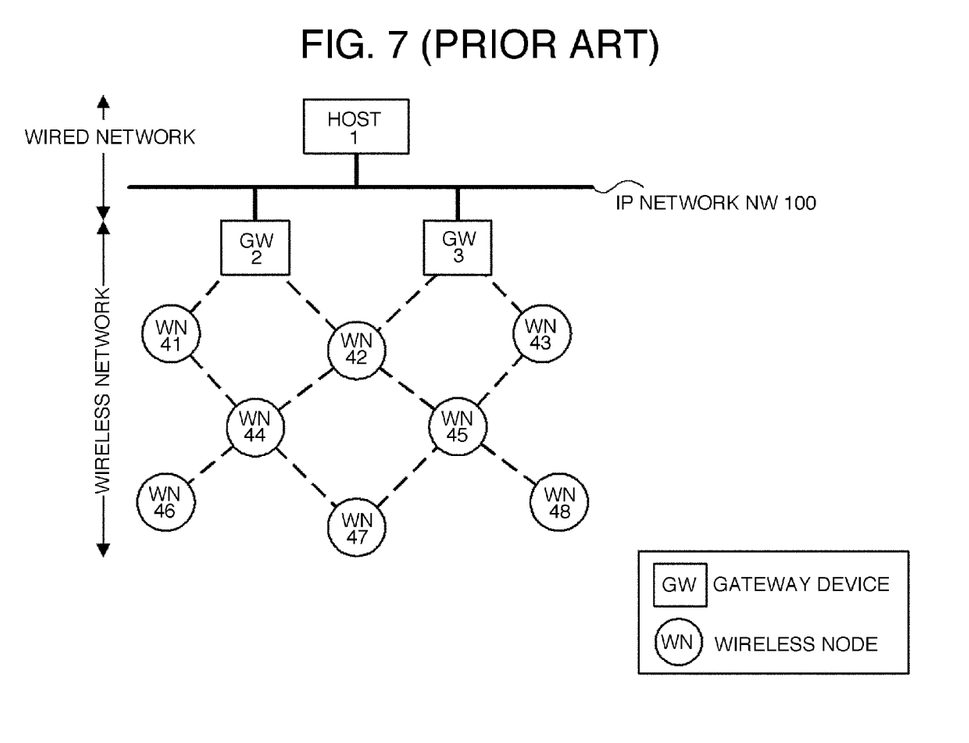
FIG. 7 is a block diagram showing a configuration of an example of a wireless control network management system using conventional gateway devices.

FIG. 7 is a block diagram showing a configuration of an example of a wireless control network management system using conventional gateway devices. In FIG. 7, the conventional wireless control network management system is made up of a host 1 for monitoring and controlling the system in whole by collecting and storing data from wireless nodes 41 to 48, gateway devices 2 and 3 (hereinafter referred to as GW devices, and expressed as GW in the drawings) for implementing communication with each wireless node, and the wireless nodes 41 to 48 (expressed as WN in the drawings) having various functions provided in field equipment such as a sensor's function for measuring physical quantity such as temperatures, flow rates, or an actuator's function for controlling a control valve, and a wireless communication function for implementing wireless transmission of measurement data.

That is, the wireless nodes 41 to 48 each have functions of various field equipment (hereinafter referred to as field equipment) such as a differential-pressure meter, a flow meter, a temperature instrument, an actuator and a controller.

The monitoring/controlling host 1 (hereinafter referred to as host) for implementing data communication with each wireless node is connected to GW devices 2 and 3 via an IP network NW 100 wherein data communication is implemented based on an IP protocol.

The GW device 2 is connected to wireless nodes 41 and 42 via a wireless network circuit (hereinafter referred to as wireless circuit), while the GW device 3 is connected to the wireless nodes 42 and 43 via the wireless circuit.

The wireless node 41 is connected to the wireless node 44 via the wireless circuit, and the wireless node 42 is connected to the wireless nodes 44 and 45 via the wireless circuit, while the wireless node 43 is connected to the wireless node 45 via the wireless circuit.

Further, the wireless node 44 is connected to the wireless nodes 46 and 47 via the wireless circuit, while the wireless node 45 is connected to the wireless nodes 47 and 48 via the wireless circuit.

Meanwhile, the wireless nodes 41 to 48 form a mesh-type multi-hop wireless network. That is, the GW devices 2 and 3 and the host 1 form a wired network while the GW devices 2 and 3, and the wireless nodes 41 to 48 form a wireless network.

The GW device 2 or 3, not shown in particular, is made up of wireless communication means for implementing wireless communication with the wireless nodes, communication means (wired) for implementing communication based on an IP protocol, between the host 1 and other GW device 3 or 2, an arithmetic control section for controlling operations of each means, and storage means for storing therein a program for causing the gateway device to operate as a gateway device and routing information reaching the host 1 from a self-device.

The wireless nodes 41 to 48 are made up of wireless communication means for implementing communication with other wireless nodes or GW device 3 or 2, an arithmetic control section for controlling operations of each means, and storage means for storing therein a program for causing the wireless nodes 41 to 48 to operate as wireless nodes, and routing information reaching the gateway device from each wireless node.

Here, the wireless nodes 41 to 48 figure out in advance routing information for transferring data to the GW device 2 or 3 by implementing route search together with address/name resolution, or setting up in advance the routing information on each wireless node by an operator.

Further, the GW device 2 or 3 figures out in advance routing information reaching each one of wireless nodes 41 to 48 or the host 1 by implementing route search together with address/name resolution, or setting up in advance the routing information on each wireless node.

Figure 8:
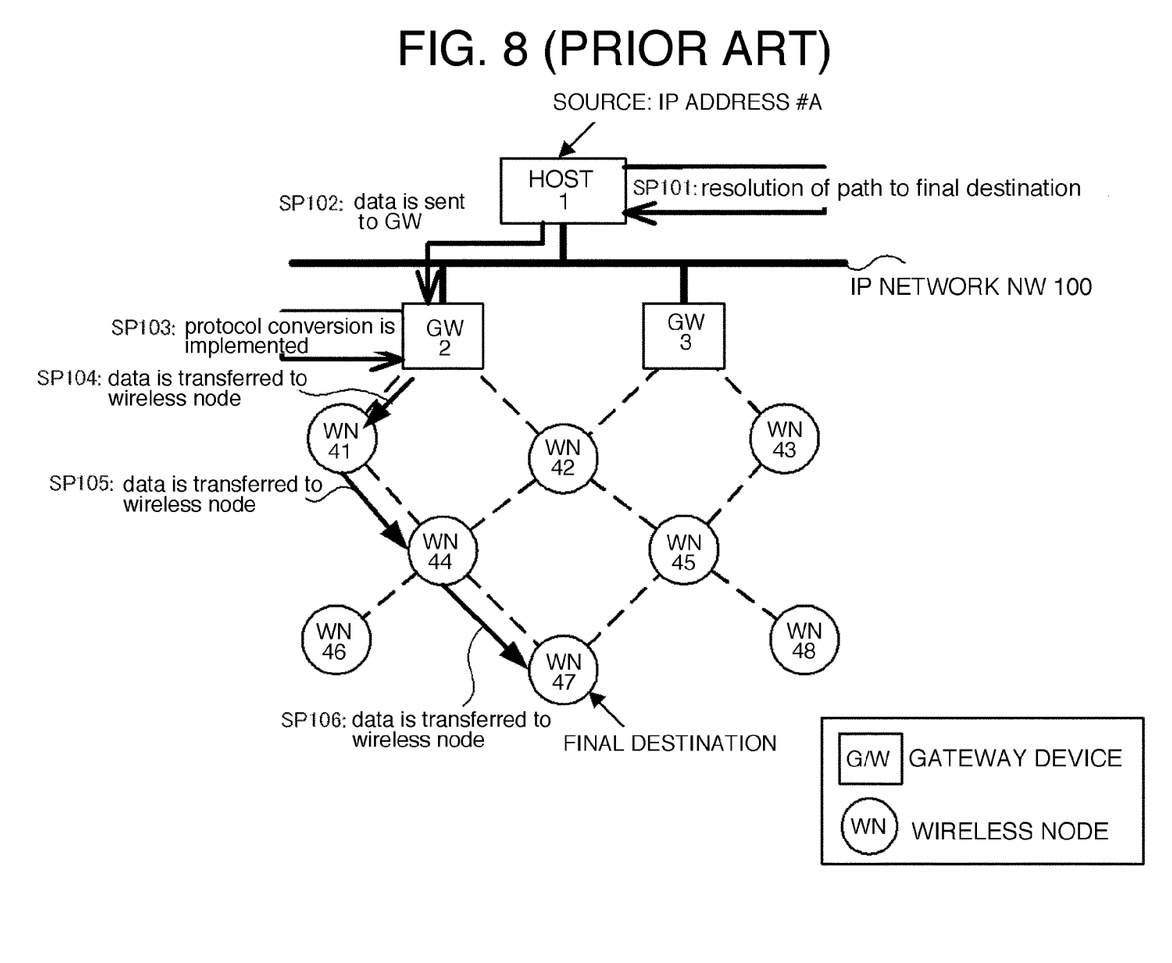
FIG. 8 is a view for explaining data communication between a host 1 and a wireless node 47 according to the conventional wireless control network management system.

FIG. 8 is a view for explaining data communication between the host 1 and the wireless node 47 in the conventional wireless control network management system, and the explanation of operations (explanation in each step) is described in FIG. 8.

In step SP101, the host 1 implements resolution of route addressed to the wireless node 47 based on routing information. That is, the host 1 selects the gateway device (e.g. GW device 2) through which data passes from the host 1. Although there are means for specifying a default gateway by an operator and means for using ARP (Address Resolution Protocol) employed by an IP network for selecting the gateway device, any means may be employed.

In Step SP102, the host 1 uses an IP protocol and sends data to the GW device 2 via an IP network NW 100.

In Step SP103, the GW device 2 implements conversion of communication protocol, for example, from data construction for IP protocol into data for mesh protocol employed by a wireless network so as to implement data communication with the wireless node 47 by sending data received from the host 1 via the IP network NW 100 by wireless communication means, not shown.

In Step SP104, the GW device 2 implements optimum routing so as to send data to the wireless node 47 based on the routing information, and sends the data to the wireless node 41 on the mesh network via the wireless circuit. Meanwhile, ZigBee or SA100.11a are illustrated by a typical example of a mesh routing technique (routing technique).

In Step SP105, the wireless node 41 implements optimum routing so as to send data received from the GW device 2 to the wireless node 47 based on the routing information, and transfers data to the wireless node 44 via the wireless circuit.

In Step SP106, the wireless node 44 sends data received from the wireless node 41 to the wireless node 47 based on the routing information via the wireless circuit.

In such a manner, according to the wireless control network management system using the conventional gateway devices, data communication between the host 1 and each wireless node can be implemented, so that, for example, the host 1 can implement send/receive of control data for adjusting valve opening of a control valve to a wireless node having an actuator's function, thereby supporting an optimum operation of a plant.

However, according to the conventional gateway devices and the wireless control network management system using the same, the wireless communication has an error factor inherent thereto such as obstruction and noise. If such communication failure occurs on a mesh network, there was a problem of the increase of a possibility of data loss between the host 1, the GW devices 2 and 3 and the wireless nodes 41 to 48.

Further, there is proposed a technique capable of avoiding the foregoing communication failure by use of routing redundancy of the mesh network. However, even in such a technique, there still exists a problem in that an error cannot be avoided if there occurs wireless communication failure at a large area or at the periphery of the gateway devices.

Further, a distance of a mesh route, i.e. a physical distance between wireless nodes or the number of hops increases depending on the positional relation between the gateway device selected by the host 1 and the wireless node serving as a data destination, causing a problem of the increase of a possibility of occurrence of a wireless communication error.

Still further, there is proposed a technique of implementing optimum routing, for example, by updating a mesh route up to the minute when the host implements resolution of selection of the gateway devices in order to avoid the foregoing problems. However, even in such a technique, the update of the mesh route generally requires data exchange such as broadcast of a control packet or notice of information of a communication link, and if data exchange is implemented excessively, leading to a problem of invitation of flooding of packets or the increase of a possibility of causing communication failure such as increase in load or radio interference caused by congestion.

Although it is possible to mitigate the impacts caused by congestion by adjusting frequency of routing update, communication environment of the wireless network is varied in response to the change of a physical condition or movement of wireless nodes, leading to a problem in that the optimum routing becomes difficult to be maintained depending on the frequency of routing update.

SUMMARY OF THE INVENTION

The invention is developed to solve the foregoing problems and it is an object of the invention to improve the reliance on a wireless control network management system.

(1) To that end, the invention provides gateway devices for relaying data communication between a monitoring/controlling host connected thereto via a wired network and a plurality of wireless nodes connected thereto via a wireless circuit and constituting a wireless network, wherein the gateway device comprises:

wireless communication means for sending data from the host (1) to at least any one of the wireless nodes; and redirect means for causing the wireless communication means to send the data to the wireless node and to transfer the data to the other gateway device (3 or 2) connected to a wired network.

(2) With the gateway device as set forth under item (1) as above further comprising:

wireless node list management means for exchanging, a wireless node list storing therein at least a network address of each one of wireless nodes and communication quality of a wireless circuit between each node, with other gateway device via the wired network, thereby sharing the wireless node list mutually with other gateway device;

said redirect means selecting each gateway device connected to the wireless nodes constituting a communication route excellent in communication quality and extending from a self-device to the wireless node (47) serving as the final destination of data from the host (1) based on the wireless node list of the other gateway device (3 or 2) obtained by the wireless node list management means, and transferring the data to the selected wireless node.

(3) The gateway device (2 or 3) as set forth under item (1) or (2) as above further comprising:

wired communication means for implementing data send/receive between the host (1) and the other gateway device (3 or 2) via the wired network, storage means for storing therein the wireless node list and routing information;

routing means for selecting a wireless node constituting a communication route excellent in communication quality and extending from self-device (2 or 3) to the wireless node (47) serving as a final destination as a wireless node of the next hop to which data is sent based on the data from the host (1) and the wireless node list;

communication protocol conversion means for mutually converting between communication data based on a communication protocol employed by the wired network and communication data based on the communication protocol employed by the wireless network; and wireless communication means (21) for sending data from the host (1), that is converted into communication data based on the communication protocol employed by the wireless network, by the communication protocol conversion means, to the wireless node selected by the routing means.

(4) A wireless control network management system for implementing data communication between a monitoring/controlling host connected to a plurality of gateway devices via a wired network and a plurality of wireless nodes constituting a wireless network via at least one of the gateway devices, wherein said wireless control network management system is provided with the gateway device as set forth under any one of items (1) to (3) as above.

According to the gateway devices and the wireless control network management system using the same of the invention, the wireless communication means sends data to the wireless node and the direct means transfers the data to the other gateway device connected to the wired network, thereby causing a data transmission route to be redundant. As a result, wireless communication failure (obstruction, noise) can be easily avoided, thereby improving the reliance on the wireless control network management system.

Further, according to the invention, since a gateway device, which implements redirect, can be suitably selected with reference to an environmental change in the plant, a robust property of the wireless network can be enhanced, thereby enhancing the reliance on the plant system in whole.

PREFERRED EMBODIMENT OF THE INVENTION

Figure 1:
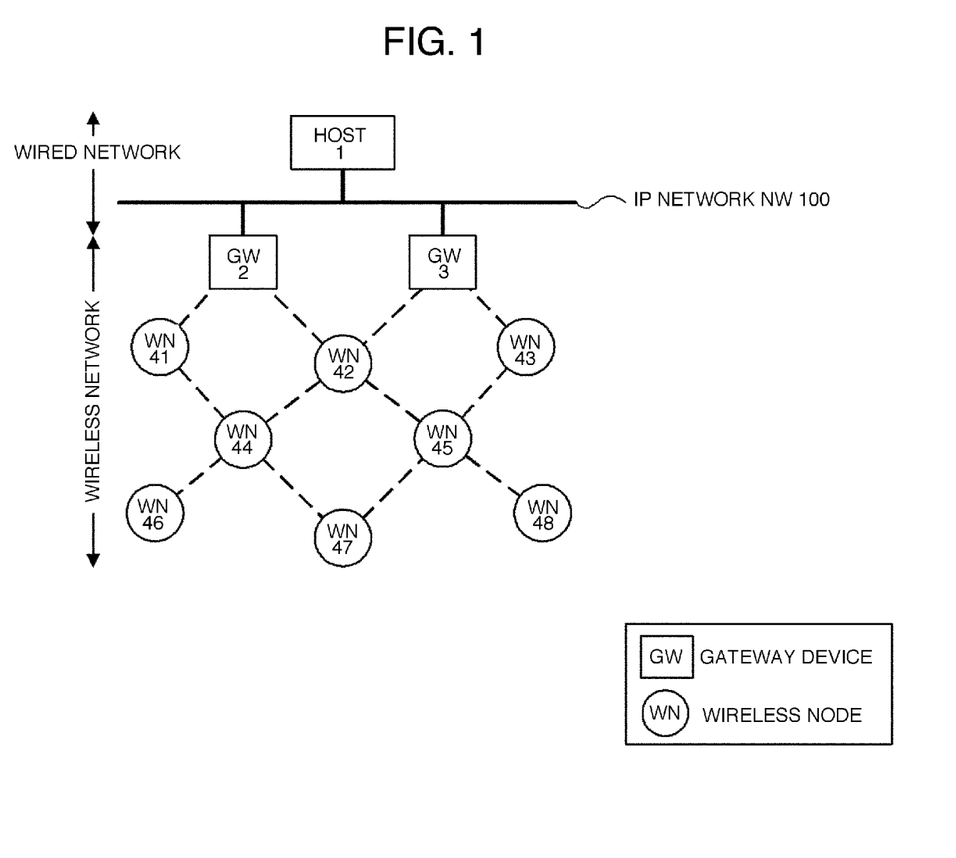
FIG. 1 is a block diagram showing a configuration of an embodiment of an example of a wireless control network management system using gateway devices according to the invention.

FIG. 1 is a block diagram showing a configuration of an embodiment of an example of a wireless control network management system using gateway devices according to the invention, and means and components, which are common to those in FIG. 7, are denoted by the same reference numerals and omitted in explanation thereof appropriately. The configuration of the wireless control network management system shown in FIG. 1 is different from that shown in FIG. 7 in that a GW device 2 or 3 of the wireless control network management system shown in FIG. 1 has redirect means for transferring data addressed to the wireless node and received from the host 1 to the other GW device 3 or 2.

In FIG. 1, the wireless control network management system according to the invention is made up of a monitoring/controlling host 1 (hereinafter referred to as host 1) and gateway devices 2 and 3 (hereinafter referred to as GW devices, and expressed as GW in the drawings) and wireless nodes 41 to 48 (expressed as WN in the drawings).

The host 1 controls the system in whole by collecting and storing data from the wireless nodes 41 to 48. The GW device 2 or 3 implements communication with each wireless node.

The wireless nodes 41 to 48 have various functions provided in field equipment such as a sensor's function for measuring physical quantity such as temperatures and flow rates, or an actuator's function for controlling a control valve, and a wireless communication function for implementing wireless transmission of measurement data. That is, the wireless nodes 41 to 48 each have functions of various field equipment (hereinafter referred to as field equipment) such as a differential-pressure meter, a flow meter, a temperature instrument, an actuator and a controller.

The host 1 for implementing data communication with each wireless node is connected to GW devices 2 and 3 via an IP network NW 100 wherein data communication is implemented based on an IP protocol.

The GW device 2 is connected to the wireless nodes 41 and 42 via a wireless network, while the GW device 3 is connected to the wireless nodes 42 and 43 via the wireless circuit.

The wireless node 41 is connected to the wireless node 44 via the wireless circuit, and the wireless node 42 is connected to the wireless nodes 44 and 45 via the wireless circuit, while the wireless node 43 is connected to the wireless node 45 via the wireless circuit.

Further, the wireless node 44 is connected to the wireless nodes 46 and 47 via the wireless circuit, while the wireless node 45 is connected to the wireless nodes 47 and 48 via the wireless circuit.

Meanwhile, the wireless nodes 41 to 48 form a mesh-type multi-hop wireless network. That is, the GW devices 2 and 3 and the host 1 form a wired network while the GW device 2 and 3, and the wireless nodes 41 to 48 form a wireless network.

Figure 2:
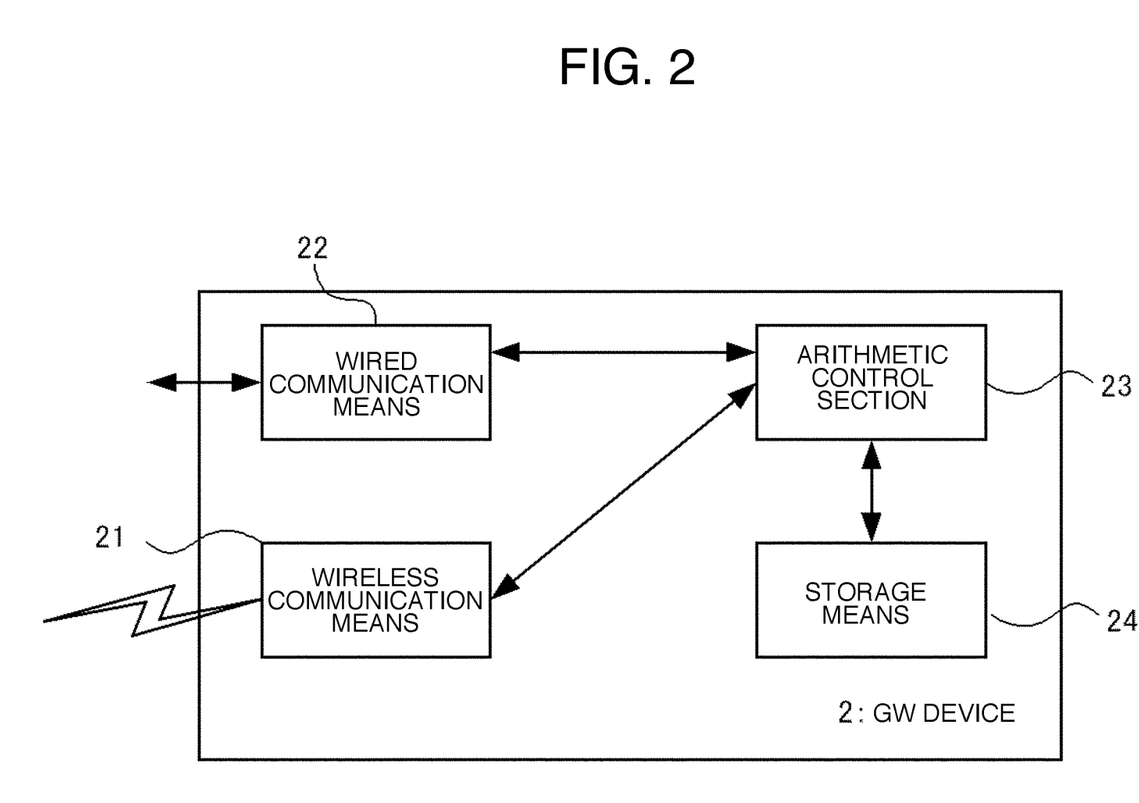
FIG. 2 is a block diagram showing a configuration of an example of a wireless communication function of a GW device 2 shown in FIG. 1.

FIG. 2 is a block diagram showing a configuration of an example of a wireless communication function of the GW device 2. In FIG. 2, wireless communication means 21 and communication means 22 (wired communication means) are connected to an arithmetic control section 23, and the arithmetic control section 23 is connected to storage means 24.

The wired communication means 22 implements data communication mainly with the host 1, for example, based on TCP/IP protocol. The wireless communication means 21 is provided with, for example, an antenna element for implementing send/receive of wireless communication, and implements data communication mainly with the wireless nodes 41 and 42, and other wireless nodes, not shown.

The arithmetic control section 23 (e.g. CPU) controls various functions and operations of each mean. The storage means 24 is made up, for example, of RAM or ROM and stores therein a program or an application for causing the GW device 2 to operate mainly as an OS (Operating System) or a gateway device, and various information such as data to be used when executing the program or application, routing information reaching the host 1 from a self-device (GW device 2), and so forth.

Figure 3:
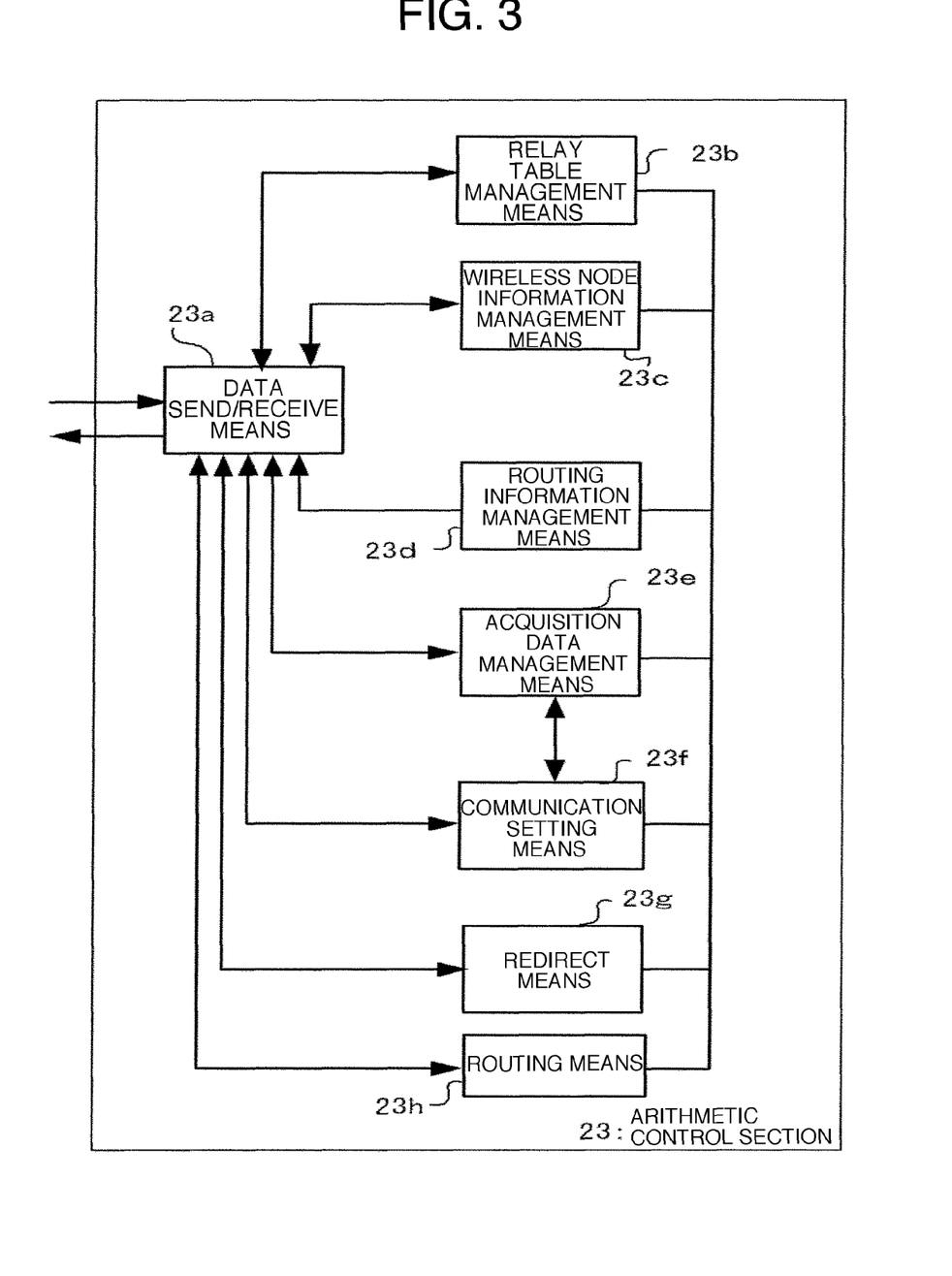
FIG. 3 is a block diagram showing a function of an arithmetic control section 23 constituting the GW device 2 in FIG. 1.

FIG. 3 is a block diagram showing a function of the arithmetic control section 23 constituting the GW device 2 in FIG. 1. The arithmetic control section 23 comprises data send/receive means 23a, relay table management means 23b, wireless node information management means 23c, routing information management means 23d, acquisition data management means 23e, communication setting means 23f, redirect means 23g and routing means 23h.

The data send/receive means 23a implements protocol conversion mainly for mutually connecting between the wired network and wireless network, and generating a data frame for communication to control the wireless communication means 21 and the wired communication means 22, thereby implementing data send/receive. Further, the data send/receive means 23a has a function to relay data in the multi-hop communication. An arbitrary algorithm may be used as an algorithm to relay data.

The protocol conversion for mutually converting between the wired network and wireless network by the data send/receive means 23a is implemented by transferring data based on mutual final destination address information contained in packet data per se received from the host 1 or each wireless node.

The relay table management means 23b prepares and manages a relay table for causing the gateway devices to implement mutual address conversion therebetween based on an ID (e.g. IP address) that can be identified commonly by both network systems of the wired and wireless networks.

The relay table management means 23*b* prepares the relay table by dynamically extracting and registering addresses of each equipment based on an advertising packet or other data from the host 1 or wireless nodes as a technique of registering and managing information of the wireless nodes. Or, the relay table may be prepared based on information, which is statically registered in advance by an operator.

The wireless node information management means 23*c* has an address managing function of the wireless nodes reachable mainly from the self-device, and causes a wireless node list for storing the wireless node information to be registered and stored in the storage means 24, and notifies this list to each gateway device so as to share this list with other gateway device (for example, it operates based on a data exchange protocol).

For information of the wireless node managed by the wireless node information management means 23*c*, there are, for example, information such as an address, an ID, a name for identifying the wireless node, and an address of other gateway device capable of reaching the wireless node. Further, the wireless node information management means 23*c* may register and store a wireless network structure.

Further, the wireless node list may include communication quality index (e.g. the number of hops and so forth) from the gateway device to the wireless node and information by which physical placement of the gateway device is found (e.g. positional information obtained by use of a GPS (Global Positioning System).

The routing information management means 23*d* stores therein mainly routing information reaching the host 1 from the self-device or routing information reaching the wireless nodes 41 to 48 from the self-device, and so forth. Routing control data including network information such as an installation place and address of the gateway device is noticed to each wireless node.

Meanwhile, for routing information, a destination address of a next hop such as at least an IP address of the gateway device or wireless node, and the final destination address serving as the IP address of the gateway device may be stored in the routing information management means 23*d*. The routing information and routing cost information are associated with each other.

Further, the routing cost information is an index representing communication quality of the entire route reaching a destination of data from the source of data, for example, it may be the number of hops, integrated value of receiving intensity of a radio wave, bit error rate, positional information (obtained by use of a GPS or a three-point measurement, and so forth) and so forth, which are calculated by each wireless node and gateway device, respectively.

The routing information management means 23*d* has a technique of registering and managing routing information, which comprises receiving a routing control packet delivered from each node or the other gateway device by dynamically implementing a search process, thereby obtaining self routing information, or preparing routing information by dynamically extracting and registering addresses of each equipment based on an advertisement packet from the host or the wireless node or other data. Or, an operator may statically register routing information in advance manually in the routing information management means 23*d*.

The acquisition data management means 23*e* stores data (measurement data) and so forth received from each of the wireless nodes 41 to 48, which is received via the wireless communication means 21 and extracted and obtained by the data send/receive means 23*a*, into the storage means 24.

The communication setting means 23*f* changes the setting of physical property of the wireless communication such as an output, a frequency or a modulation system of the wireless communication means 21, and causes the changed wireless communication set information (changed set physical property) to store into the storage means 24.

The redirect means 23*g* implements redirect (transfer) of predetermined data addressed to the wireless node and received from the host 1 to the other GW device 2 via the IP network NW 100. The redirect means 23*g* determines the redirect destination with reference to the wireless node list.

Further, the redirect means 23*g* may employ an arbitrary algorithm to determine the number of gateway devices to be selected as a redirect destination or a standard of selection based on node information kept therein.

This algorithm may be fixedly set in advance or a policy thereof may be changed in the middle of an operation of the system. More specifically, the redirect means 23*g* uses an algorithm for selecting the gateway device as the direct destination based on a predetermined index (communication quality of a communication route extending to the wireless node as the final destination, a physical distance between gateway devices) stored in the wireless node list in order to optimize a mesh route.

The routing means 23*h* selects a wireless node constituting a communication route excellent in communication quality and extending from the GW device 2 to the wireless node serving as the final destination of data received from the host 1 as a wireless node of a next hop to which data is sent based on data from the host 1 and the wireless node list.

Further, the GW device 3, not shown in particular, has the same configuration as the GW device 2.

Figure 4:
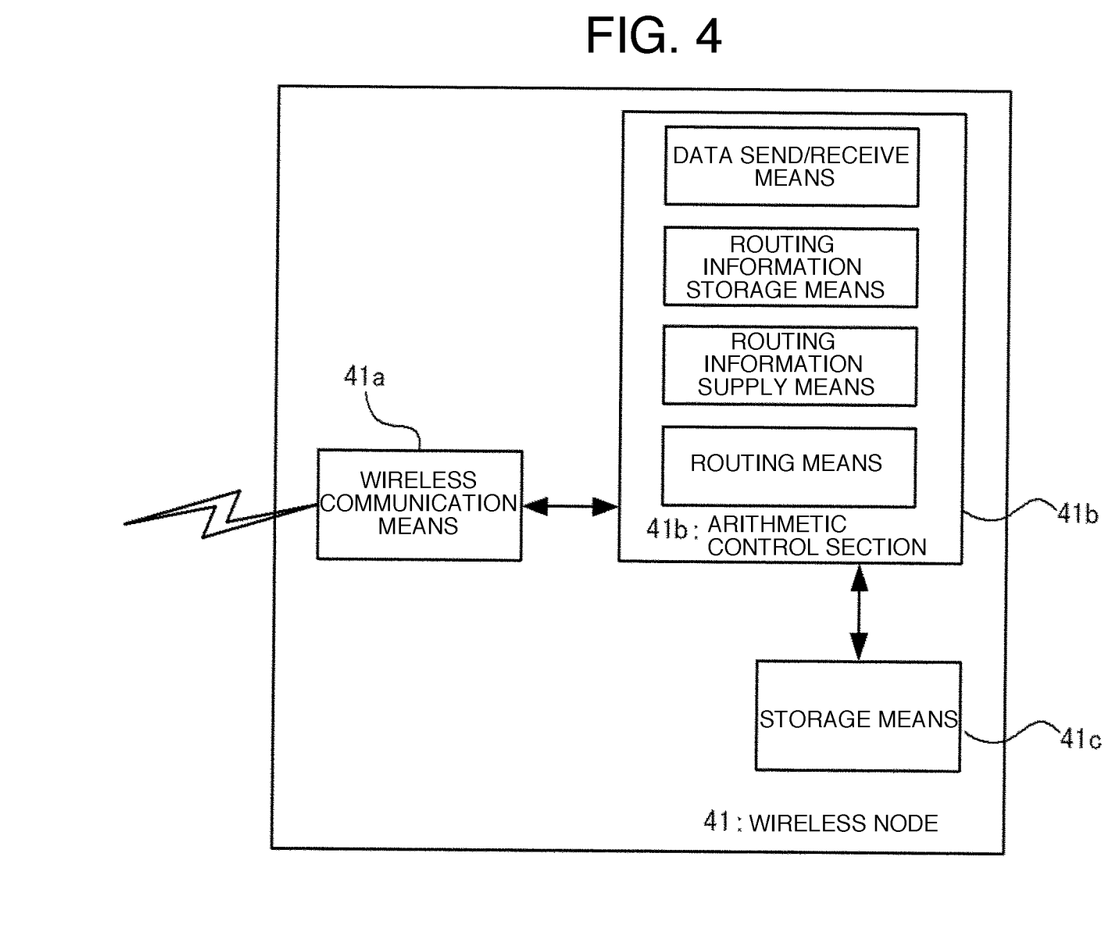
FIG. 4 is a block diagram showing a configuration of an example of a wireless communication function of a wireless node 41 shown in FIG. 1.

FIG. 4 is a block diagram showing a configuration of an example of a wireless communication function of the wireless node 41 shown in FIG. 1. In FIG. 4, the wireless communication means 41*a* is connected to an arithmetic control section 41*b*, and the arithmetic control section 41*b* is connected to storage means 41*c*.

The wireless communication means 41*a* implements communication mainly with the gateway device, for example, it implements data communication with the gateway device based on a TCP/IP protocol. The wireless communication means 41*a* implements wireless communication mainly with the other wireless node or other GW information notice data device, not shown.

The arithmetic control section 41*b* (e.g., CPU) controls various functions or operations of each means. The storage means 41*c* stores therein a program or an application for causing the wireless node 41 to operate mainly as an OS or a wireless node, data used for executing the program or application, various information such as routing information reaching the other wireless node or the gateway device from the self-node, routing cost information, and physical property information of wireless communication such as an output, a frequency or a modulation system and so forth of the wireless communication of each gateway device. The wireless nodes 42 to 48 have the same configuration as the wireless node 41.

Meanwhile, for routing information, an address of a next hop such as at least IP address of a wireless node or gateway device, and the final address serving as the IP address of the gateway device may be stored. The routing information and routing cost information are associated with each other.

Further, the routing cost information is an index representing communication quality of the entire route reaching a data destination from a data source, for example, it may be the number of hops calculated by each wireless node and gateway device, respectively, or an integrated value of receiving intensity of a radio wave, bit error rate, positional information (obtained by use of a GPS or a three-point measurement, and so forth).

Figure 5:
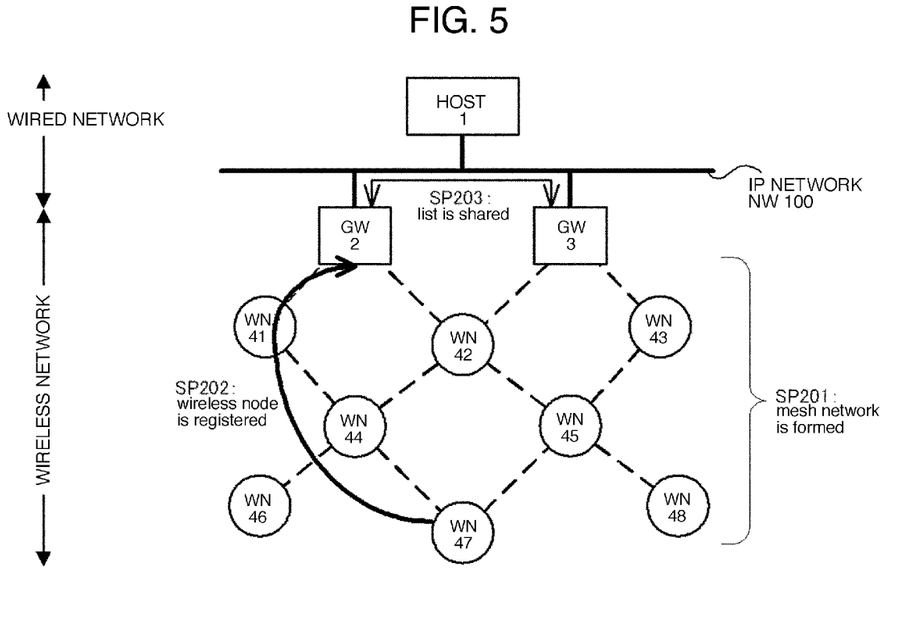
FIG. 5 is a block diagram showing a function of an arithmetic control section 41b constituting the wireless node 41 in FIG. 1.

FIG. 5 is a block diagram showing a function of the arithmetic control section 41b constituting the wireless node 41 in FIG. 1. Data send/receive means generates mainly a data frame and implements data send/receive. Routing information storage means mainly stores therein a next hop address, routing information reaching each wireless node or gateway device, routing cost information, and so forth.

Routing information supply means notifies network information such as installation places and addresses of the self-node and other wireless node to the other wireless nodes.

The routing means implements optimum routing in order to transfer measurement data to the other wireless node or gateway device based on routing information and routing cost information stored in the routing information storage means and physical property of the wireless communication such as an output, a frequency, a modulation system and so forth of the wireless communication of other wireless node or GW device 2 or 3. Sensor means controls physical quantity such as flow rates or temperatures by controlling sensors, not shown.

Further, although not shown in particular, the host 1 in FIG. 1 is provided with communication means for implementing data communication in the IP network NW 100, an arithmetic control section for controlling each function of the host 1 such as a function to resolve network addresses of the wireless node and gateway device of a forwarding destination, and a function to monitor the wireless network to execute and control a control application and so forth, and storage means for storing therein a program or an application for causing the host 1 to operate mainly as an OS or a host, data used for executing the program or application, and routing information reaching the GW device 2 or 3 from the host 1.

Meanwhile, the host 1 may employ any technique, when resolving address of the wireless node or gateway device serving as a forwarding destination, for example, it may employ ARP or IPV6 Neighbo Discovery on the IP network NW 100 or a resolving mechanism for expanding ARP or IPV6 Neighbo Discovery.

Although data communication is implemented via the IP network NW 100 according to the invention, the invention is not limited thereto in particular. For example, data communication may be implemented by use of other network such as an industrial network, e.g., FF (Foundation Fieldbus (registered trademark), MODBUS, and BACnet.

Figure 6:
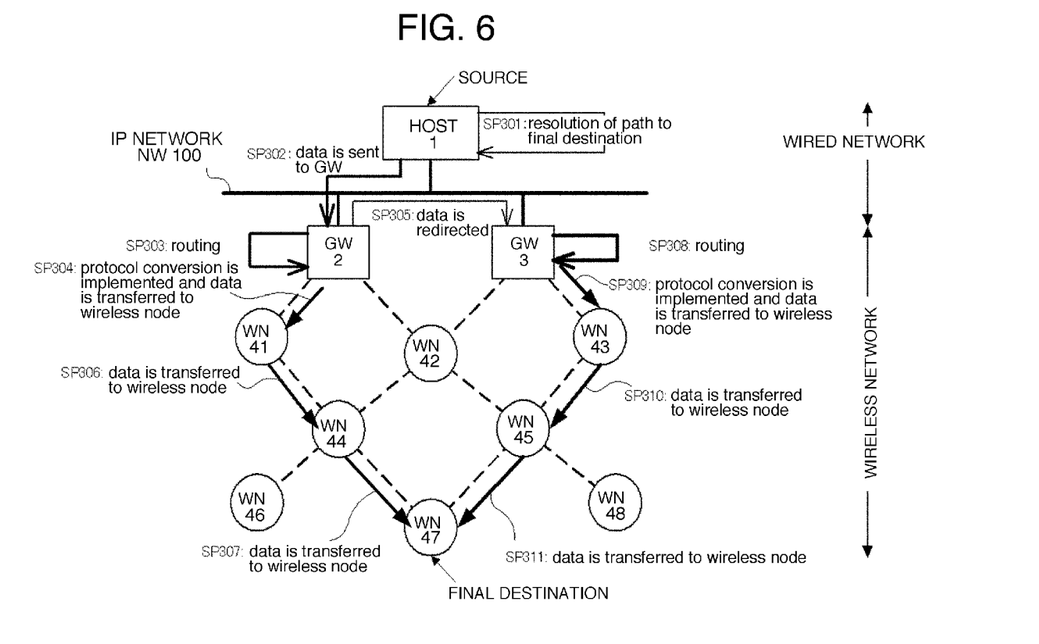
FIG. 6 is a view for explaining the operation of redirecting data received by the gateway device to other gateway device according to the invention.

FIG. 5 is a view for explaining the operation of registering each wireless node information in the gateway device according to the gateway devices and wireless control network management system using the same of the invention, and FIG. 6 is a view for explaining the operation of redirecting data, received by the gateway device, to the other gateway device according to the invention. Explanation of operations (explanation in each step) is described in FIGS. 5 and 6.

In step SP201 in FIG. 5, a mesh network is formed between the wireless nodes 41 to 48 and the GW devices 2 and 3. More specifically, each of the wireless nodes 41 to 48 and the GW devices 2 and 3 may constitute the mesh network by being fixedly set manually by an operator or constitute a mesh network which dynamically established a route when each of the wireless nodes 41 to 48 implements route search. In the case of employment of the latter constitution of the mesh network, for example, it is possible to employ a structure wherein the gateway device delivers routing information within the wireless network.

In step SP202, the wireless node information management means 23c of the GW device 2 or 3 acquires wireless node information of each of the wireless nodes 41 to 48, and registers and stores the wireless node information in the wireless node list of the storage means 24. This step may be repeatedly implemented until wireless node information of all the wireless nodes on the mesh network is registered.

More specifically, each of the wireless nodes 41 to 48 sends a registration request packet to the GW device 2 and 3, and the wireless node information management means of the GW device 2 and 3 extracts necessary wireless node from the registration packet, and stores the necessary wireless node in the wireless node list as wireless node information. Also, an operator may set the wireless node beforehand in the wireless node list.

In step SP203, the wireless node information management means 23c of the GW device 2 or 3 shares the wireless node list between the other GW device 3 or 2.

More specifically, the wireless node information management means 23c of the gateway device periodically exchanges data including the wireless node list between the GW device 2 or 3 and the other GW device 3 or 2 via the IP network NW 100. Or more specifically, in the case where the wireless node list is updated and changed due to addition/deletion of the wireless node, the wireless node information management means 23c of the gateway device may notify the difference in the wireless node list to the GW device 2 or 3 or the other GW device 3 or 2.

The gateway device according to the invention figures out the wireless node information of the wireless nodes constituting the mesh network and shares the wireless node information mutually with other gateway device via the wired network, thereby figuring out and recording each wireless node information of the wireless control network management system.

In step SP301 in FIG. 6, the host 1 selects a gateway device constituting an optimum mesh network route so as to send data to the wireless node 47 serving as a final destination. More specifically, the host 1 selects the optimum route and the GW device 2 or 3 constituting the optimum route based on the routing information and routing cost information such as communication quality of each hop extending to the wireless node 47 serving as the final destination, stored in the storage section, respectively.

In step SP302, the host 1 sends data to the GW device 2 selected in step SP301 via the IP network NW 100.

In step SP303, the routing means 23h of the GW device 2 extracts the final destination (wireless node 47) from data received from the host 1, and selects the wireless node 41 constituting an optimum mesh network route extending from the self-device to the final destination based on the relay table, routing information and routing cost information stored in the storage means 24.

More specifically, the routing means 23h selects the wireless node 41 constituting a communication route excellent in communication quality and extending from the GW device 2 to the wireless node of the final destination as the wireless node of a next hop to which data is sent based on data from the host 1 and the wireless node list.

In step SP304, the data send/receive means 23a of the GW device 2 implements protocol conversion for mutually connecting between the wired network and wireless network based on data received from the host 1, generates a data frame for implementing communication with each wireless node, controls the wireless communication means 21 to send data to the wireless node 41 selected in step SP303. Meanwhile, the flow of data transferred from the GW device 2 to the wireless node 41 is described in steps SP306 to SP307, described later.

In step SP305, the redirect means 23g of the GW device 2 extracts the final destination (wireless node 47) from data received from the host 1, and selects the GW device 3 constituting a mesh network route extending from the self-device to the final destination based on the wireless node list, routing information and routing cost information stored in the storage means 24, and redirects (transfers) the data to the GW device 3 via the IP network NW 100. Meanwhile, the flow of data from the GW device 3 to the wireless node 47 is described in steps SP308 to SP310, described later.

At this point in time, the redirect means 23g may employ an arbitrary algorithm based on node information kept therein to determine the number of gateway devices to be selected as a redirect destination or a standard of selection, or may redirect (transfer) data to a plurality of gateway devices via the IP network NW 100. To that end, data passes through a plurality of gateway devices, thereby causing a data transmission route to be redundant.

Further, the redirect means 23g may be formed of means for selecting the gateway devices, which constitute the mesh network route extending from the self-device to the final destination and are physically dispersed, based on the wireless node list, routing information, routing cost information (communication quality of the route to the wireless node serving as the final destination, a physical distance between the gateway devices) stored in the storage means 24, while a communication quality is excellent between each wireless node constituting the mesh network route, and for redirecting (transferring) data to the selected gateway device.

In other words, the redirect means 23g selects each gateway device to be connected to the wireless nodes constituting the communication route excellent in communication quality extending from the self-device to the wireless node serving as the final destination of data from the host 1 based on the wireless node list of the other gateway device obtained by the wireless node information management means, and transfers the data to the selected each gateway device.

Accordingly, it is possible to mitigate the congestion of a wireless radio wave by the employment of the gateway devices, which are excellent in communication quality between each gateway device and the wireless node, and are physically dispersed.

Meanwhile, in step SP306, the wireless node 41 extracts the final destination (wireless node 47) from data received from the GW device 2, and selects the wireless node 44 constituting an optimum route for delivering data to the wireless node 47 constituting the optimum mesh network route extending from the self-node to the final destination, and transfers the received data to the wireless node 44 via the wireless circuit.

In step SP307, the wireless node 44 extracts the final destination (wireless node 47) from data received from the wireless node 41, and selects an optimum mesh network route extending from the self-node to the final destination based on the routing information and routing cost information stored in the storage section, and transfers the received data to the wireless node 47 via the wireless circuit.

On the other hand, in step SP308, the routing means of the GW device 3 extracts the final destination (wireless node 47) from data received from the host 1, and selects the wireless node 43 constituting the optimum mesh network route extending from the self-device (GW device 3) to the final destination based on routing information and routing cost information stored in the storage section.

More specifically, the routing means 23h selects the wireless node 43 constituting the communication route excellent in communication quality and extending from the GW device 3 to the wireless node 47 serving as the final destination as the wireless node of the next hop to which data is sent based on data from the host 1 and the wireless node list.

In step SP309, the data send/receive means 23a of the GW device 3 implements protocol conversion for mutually connecting between the wired network and wireless network based on data received from the host 1, generates a data frame for communicating with each wireless node to control the wireless communication means, and transfers data to the wireless node 43 selected in step SP308.

In step SP310, the wireless node 43 extracts the final destination (wireless node 47) from data received from the GW device 3, and selects the wireless node 45 constituting the optimum route for transferring data to the wireless node 47 constituting the optimum mesh network route extending from the self-node to the final destination based on the routing information and routing cost information stored in the storage section, and transfers the received data to the selected wireless node 45 via the wireless circuit.

In step SP311, the wireless node 45 extracts the final destination (wireless node 47) from data received from the wireless node 43, and selects the optimum mesh network route extending from the self-node to the final destination based on the routing information and routing cost information stored in the storage section, and transfers the received data to the wireless node 47 via the wireless circuit.

In such a manner, the wireless communication means sends data to the wireless node and the direct means transfers the data to the other gateway device connected to the wired network, thereby causing a data transmission route to be redundant. As a result, wireless communication failure (obstruction, noise) can be easily avoided, thereby improving the reliance on the wireless control network management system.

Further, according to the invention, since a gateway device, which implements redirect, can be suitably selected with reference to an environmental change in the plant, a robust property of the wireless network can be enhanced, thereby enhancing the reliance on the plant system in whole.

Still further, according to the invention, since the wireless communication means sends data to the wireless node while the direct means transfers the same data to the other gateway device connected to the wired network, so that the host 1 and each wireless node can implement data communication redundantly. As a result, for example, when the host 1 sends a control data for adjusting valve opening of a control valve to the wireless node having an actuator's function, the reliance on data communication can be improved, thereby supporting the optimum operation of the plant.

More still further, although the forgoing embodiment explained the example wherein the wireless control network management system supports the operation of the plant in the industrial automation, the invention is not limited to the foregoing embodiment. For example, the wireless control network management system of the invention may support the operation of a control system of a water purifying plant in factory automation, or the operation of air conditioning and illumination system of a building.

Supporting that illumination, switches and so forth serve as wireless nodes in a building automation system, many obstruction such as equipment, furniture and fixtures and so forth exists inside the building in which the wireless nodes are installed, so that radio disturbance is likely to occur.

In this case, if the gateway devices and the wireless control network management system using the same of the invention are introduced, it is possible to cause a wireless communication route to be redundant by a plurality of gateway devices, so that the robust property of the wireless network and the communication stability can be ensured.

As mentioned in detail above, according to the gateway devices and the wireless control network management system using the same, the wireless communication means sends data to the wireless nodes while the direct means transfers the same data to the other gateway device connected to the wired network, thereby causing a data transmission route of the mesh network to be redundant. As a result, it is possible to easily avoid the wireless communication failure (obstruction, noise), thereby improving the reliance on the wireless control network management system, to contribute to the appropriate operation of the wireless communication system in whole.

What is claimed is:

1. A gateway device for relaying data communication between a monitoring/controlling host connected thereto via a wired network and a plurality of wireless nodes connected thereto via a wireless circuit and constituting a wireless network, said gateway device comprising:
    wireless communication means for sending data from the host to at least one selected wireless node in the plurality of wireless nodes using a wireless communication protocol different than a wired communication protocol used for the wired network;
    redirect means for causing the wireless communication means to send the data to the selected wireless node and to transfer the data via the wired network to another gateway device of a plurality of other gateway devices connected to the wired network;
    wireless node list management means for exchanging a wireless node list, storing therein at least a network address of the wireless communication protocol of each one of the wireless nodes and a communication quality of a wireless circuit between each wireless node, with the plurality of other gateway devices via the wired network, thereby sharing the wireless node list with the plurality of other gateway devices,
    wherein said redirect means selects said another gateway device from among the plurality of other gateway devices having a communication quality value better than a communication quality value of the other gateway devices for a communication route extending from said another gateway device to the selected wireless node, based on the wireless node list of the plurality of other gateway devices obtained by the wireless node list management means, and transferring the data to the selected wireless node;
    wired communication means for implementing data send/receive between the host and said another gateway device via the wired network;
    storage means for storing therein the wireless node list and routing information; routing means for selecting one or more wireless nodes from among the plurality of wireless nodes that form a communication route extending from the gateway device to the selected wireless node having a cumulative communication quality value between each of the wireless nodes in the communication route that is better than a cumulative communication quality value between other wireless nodes in the plurality of wireless nodes, based on the data from the host and the wireless node list;
    communication protocol conversion means for mutually converting between communication data based on the wired communication protocol and communication data based on the wireless communication protocol; and
    wireless communication means for sending data from the host, that is converted into communication data based on the wireless communication protocol by the communication protocol conversion means, to the selected wireless node via the communication route determined by the routing means.

2. A wireless control network management system for implementing data communication between a monitoring/controlling host connected to a plurality of gateway devices via a wired network and a plurality of wireless nodes constituting a wireless network via at least one of the gateway devices,
    wherein said wireless control network management system is provided with the gateway device as set forth under claim 1.

3. A wireless control network management system for implementing data communication between a monitoring/controlling host connected to a plurality of gateway devices via a wired network and a plurality of wireless nodes constituting a wireless network via at least one of the gateway devices, wherein said wireless control network management system is provided with the gateway device as set forth under claim 1.

* * * * *